(12) United States Patent
Baert et al.

(10) Patent No.: US 12,110,695 B2
(45) Date of Patent: Oct. 8, 2024

(54) FLOOR PANEL AND METHOD OF PRODUCING SUCH A FLOOR PANEL

(71) Applicant: Champion Link International Corporation, The Valley (AI)

(72) Inventors: Thomas Luc Martine Baert, Sint-Martens-Latem (BE); Anthony Drevet, Jiaxing (CN)

(73) Assignee: Champion Link International Corporation, The Valley (AI)

( * ) Notice: Subject to any disclaimer, the term of this patent is extended or adjusted under 35 U.S.C. 154(b) by 0 days.

(21) Appl. No.: 16/624,509

(22) PCT Filed: Jun. 22, 2018

(86) PCT No.: PCT/EP2018/066809
§ 371 (c)(1),
(2) Date: Dec. 19, 2019

(87) PCT Pub. No.: WO2018/234561
PCT Pub. Date: Dec. 27, 2018

(65) Prior Publication Data
US 2020/0123788 A1 Apr. 23, 2020

(30) Foreign Application Priority Data

Jun. 22, 2017 (NL) ..................................... 2019108

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 5/028* (2013.01); *B32B 7/12* (2013.01);
(Continued)

(58) Field of Classification Search
CPC . Y10T 428/17; Y10T 428/18; Y10T 428/183; Y10T 428/187; Y10T 428/24942;
(Continued)

(56) References Cited

U.S. PATENT DOCUMENTS

| 6,688,061 B2 | 2/2004 | Garcia |
| 10,066,401 B2 | 9/2018 | Segaert et al. |

(Continued)

FOREIGN PATENT DOCUMENTS

| CN | 2642917 Y | 9/2004 |
| CN | 100419019 C | 9/2008 |

(Continued)

OTHER PUBLICATIONS

Machine translation (Espacenet) of KR 2010-0025799 A. Translated Dec. 15, 2020. (Year: 2020).*

(Continued)

*Primary Examiner* — Maria V Ewald
*Assistant Examiner* — Ethan A. Utt
(74) *Attorney, Agent, or Firm* — The Webb Law Firm (57) ABSTRACT

The invention relates to a floor panel, in particular a magnesium oxide based floor panel, which is preferably provided with interconnecting coupling parts for mutually connecting adjacent floor panels to each other. The invention also relates to a method of producing a floor panel, in particular a magnesium oxide based floor panel.

24 Claims, 7 Drawing Sheets

(51) Int. Cl.
| | |
|---|---|
| *B32B 5/02* | (2006.01) |
| *B32B 7/12* | (2006.01) |
| *B32B 13/12* | (2006.01) |
| *B32B 13/14* | (2006.01) |
| *B32B 27/30* | (2006.01) |
| *E04F 15/02* | (2006.01) |

(52) U.S. Cl.
CPC ............. *B32B 13/12* (2013.01); *B32B 13/14* (2013.01); *B32B 27/304* (2013.01); *E04F 15/02038* (2013.01); *E04F 15/02188* (2013.01); *E04F 15/102* (2013.01); *B32B 2255/02* (2013.01); *B32B 2262/101* (2013.01); *B32B 2307/554* (2013.01); *B32B 2307/7265* (2013.01); *B32B 2419/04* (2013.01); *E04F 2201/0146* (2013.01); *E04F 2201/0153* (2013.01); *E04F 2201/023* (2013.01); *E04F 2201/043* (2013.01)

(58) Field of Classification Search
CPC ....... Y10T 428/2495; Y10T 428/24967; Y10T 428/24983; Y10T 428/24992; Y10T 428/249924; Y10T 428/249925; Y10T 428/249932; Y10T 428/26; Y10T 428/266; Y10T 428/27; Y10T 428/31971; Y10T 428/31975; Y10T 428/31978; Y10T 428/31982; Y10T 428/31986; Y10T 428/31989; Y10T 428/31993; Y10T 428/31996; Y10T 442/10; Y10T 442/102; Y10T 442/133; Y10T 442/14; Y10T 442/148; Y10T 442/153; Y10T 442/155; Y10T 442/157; Y10T 442/171; Y10T 442/172; Y10T 442/176; Y10T 442/184; Y10T 442/191; Y10T 442/198; Y10T 442/20; Y10T 442/2926; Y10T 442/2992; Y10T 442/30; Y10T 442/3049; Y10T 442/3976; Y10T 442/60; Y10T 442/603; Y10T 442/604; Y10T 442/696; B32B 3/00; B32B 3/02; B32B 3/06; B32B 5/00; B32B 5/02; B32B 5/028; B32B 5/22; B32B 5/24; B32B 5/26; B32B 13/00; B32B 13/02; B32B 13/04; B32B 13/14; B32B 17/00; B32B 17/02; B32B 2419/00; B32B 2419/04; B32B 5/022; B32B 5/024; B32B 5/262; B32B 5/263; B32B 5/265; B32B 5/266; B32B 5/273; B32B 5/275; B32B 5/277; B32B 13/08; B32B 13/10; B32B 2607/00; E04B 1/00; E04B 1/02; E04B 1/04; E04B 1/12; E04B 1/14; E04B 1/62; E04B 1/92; E04B 1/94; E04B 1/941; E04B 1/942; E04B 1/943; E04B 1/944; E04B 5/00; E04B 5/02; E04B 5/04; E04B 2103/00; E04B 2103/02; E04B 2103/04; E04B 2/00; E04B 2/02; E04B 2/72; E04C 2/00; E04C 2/02; E04C 2/04; E04C 2/049; E04C 2/06; E04C 2/10; E04C 2/16; E04C 2/24; E04C 2/243; E04C 2/26; E04C 2/284; E04C 2/288; E04C 2/30; E04C 2/40; E04C 2002/001; E04C 2002/004; E04C 2/44; E04C 2/46; E04C 2/50; E04F 15/00; E04F 15/02; E04F 15/02038; E04F 15/022; E04F 15/08; E04F 15/082; E04F 15/10; E04F 15/107; E04F 2201/01; E04F 2201/0107; E04F 2201/0115; E04F 2201/0123; E04F 2201/013; E04F 2201/0138; E04F 2201/0146; E04F 2201/02; E04F 2201/023; E04F 2201/03; E04F 2201/035; E04F 2201/04; E04F 2201/043; Y10S 428/92; Y10S 428/921; C04B 2/00; C04B 9/00; C04B 9/02; C04B 9/04; C04B 9/11; C04B 16/00; C04B 16/02; C04B 16/12; C04B 35/00; C04B 35/01; C04B 35/03; C04B 35/04; C04B 2201/00; C04B 2201/20; C04B 2201/30; C04B 2201/50

USPC ..... 428/53, 54–56, 212, 213, 215, 217–220, 428/292.1, 292.4, 294.7, 332, 337, 340, 428/688, 689, 699–703, 920, 921, 428/532–537.7; 52/506.1, 578, 588.1, 52/589.1–592.6; 442/1, 2, 20, 24, 29, 32, 442/33, 34, 42, 43, 45, 50, 54, 58, 59, 442/172, 180, 181, 187, 301, 327, 330, 442/331, 414; 106/638, 801, 802, 804, 106/805, 286.1, 286.6, 400, 401, 407, 106/461, 471, 499, 501.1, 819, 823

See application file for complete search history.

(56) References Cited

U.S. PATENT DOCUMENTS

| | | | |
|---|---|---|---|
| 2006/0070321 A1* | 4/2006 | Au | C04B 28/26 52/232 |
| 2009/0004378 A1* | 1/2009 | Jones | B28B 1/08 427/180 |
| 2009/0065972 A1* | 3/2009 | Feigin | C04B 28/32 264/241 |
| 2010/0247937 A1* | 9/2010 | Liu | C04B 28/14 428/500 |
| 2013/0180193 A1 | 7/2013 | Bossuyt | |
| 2018/0283014 A1* | 10/2018 | Hodgkins | B32B 21/047 |

FOREIGN PATENT DOCUMENTS

| | | | | |
|---|---|---|---|---|
| CN | 101922225 | A | 12/2010 | |
| CN | 101941218 | A | 1/2011 | |
| CN | 202265980 | U | 6/2012 | |
| CN | 103206063 | A | 7/2013 | |
| CN | 104131680 | A | 11/2014 | |
| CN | 104428475 | A | 3/2015 | |
| CN | 106121187 | A | 11/2016 | |
| CN | 106968413 | A * | 7/2017 | |
| EP | 1022400 | A1 | 7/2000 | |
| EP | 2060389 | A1 * | 5/2009 | ............. B32B 13/04 |
| JP | 201466078 | A | 4/2014 | |
| KR | 1020080042995 | A | 5/2008 | |
| KR | 20100025799 | A * | 3/2010 | |
| KR | 1020110045402 | A | 5/2011 | |
| WO | 9916984 | A1 | 4/1999 | |
| WO | WO-2015051419 | A1 * | 4/2015 | ............. B28B 1/008 |

OTHER PUBLICATIONS

Machine translation (Espacenet) of CN 106968413 A. Translated Dec. 19, 2020. (Year: 2020).*

Yongning, "Building Materials," Textbooks for National Higher Agriculture Colleges, 2006, 7 pages. Machine-translated English-language Abstract attached.

* cited by examiner

FLOOR PANEL AND METHOD OF PRODUCING SUCH A FLOOR PANEL

CROSS-REFERENCE TO RELATED APPLICATIONS

This application is the United States national phase of International Application No. PCT/EP2018/066809 filed Jun. 22, 2018, and claims priority to The Netherlands Patent Application No. 2019108 filed Jun. 22, 2017, the disclosures of which are hereby incorporated by reference in their entirety.

BACKGROUND OF THE INVENTION

Field of the Invention

The invention relates to a floor panel, in particular a magnesium oxide based floor panel, which is preferably provided with interconnecting coupling parts for mutually connecting adjacent floor panels to each other. The invention also relates to a method of producing a floor panel, in particular a magnesium oxide based floor panel.

DESCRIPTION OF THE RELATED ART

In the field of floor and wall coverings, panels are widely used based on wood materials or derivatives thereof, especially as a material for the main or core layer of the panel. An example is given in U.S. Pat. No. 6,688,061. A major disadvantage is the hygroscopic nature of such materials, which affects the lifetime and durability of such panels. As an alternative several thermoplastic materials such as polyvinyl chloride is used, which while being water resistant, present other disadvantages. Polyvinyl chloride (PVC) that is used for panels such as in patent CN 100419019, has a flexible quality which requires a perfectly smooth and even surface of the substrate on which the panel covering is applied. If such is not the case, any unevenness will be visible through the panel as it conforms with the underlying substrate surface, which is a detrimental effect from an aesthetic point of view to the user. Furthermore, the use of PVC as core material in a floor panel leads to floor panel which is susceptible to temperature changes in its ambient environment which will cause the vinyl flooring to expand and contract with normal hot and cold fluctuations. There is a general need in the field to develop a floor panel which while having waterproof properties, can be produced with a relatively uniform thickness leading to a relatively even (flat) upper surface. There is also a need in the field to develop a floor panel of which the thickness can be adjusted relatively easily during production, while maintaining sufficient strength of the panel. There is furthermore a need to develop a fireproof panel.

It is an objective of the invention to meet at least one of the needs addressed above.

SUMMARY OF THE INVENTION

The above objective of the invention, is met by the provision of a panel, in particular a floor panel, according to the above preamble, comprising a laminate of: magnesium oxide based core layer, at least one magnesium oxide based upper crust layer positioned on top of said core layer, wherein the density of said upper crust layer is preferably larger than the density of the core layer, and at least one upper reinforcing layer situated in between said core layer and said at least one upper crust layer. The application of magnesium oxide (MgO) as material in the floor panel leads to significant less flammability compared to traditional wood based and/or PVC based floor panels, wherein the MgO based floor panel according to the invention may even be completely fire-resistant (inflammable). Moreover, the application of MgO in the core layer and the crust layer(s) makes the floor panel also waterproof. Additionally, the application of MgO in the core layer and crust layer(s) of the floor panel according to the invention leads to a floor panel which is less susceptible for temperature changes and is dimensionally stable during ambient temperature fluctuations. Another important advantage of the floor panel according to the invention is the application of a particular laminate of layers, wherein the relatively high-density upper crust layer is configured to be subjected to a sanding treatment (also referred to a sandblasting treatment, or to a dry abrasive blast cleaning process) in order to accurately and uniformly reduce the thickness of said crust layer, and hence the thickness of the floor panel as such. Hence, during production of floor panels with different desired panel thicknesses (e.g. 6, 8, and 10 mm), one may take the abovementioned (uniform) laminate of layers as (uniform) starting point, after which the upper crust layer is sanded to such an extent that the desired panel thickness is achieved. The presence of at least one upper reinforcement layer improves the panel strength, and allows the upper crust layer to be sanded. Moreover, the upper reinforcement layer also provides additional panel strength during use of the panels. The relatively low-density core layer is less compact than the crust layer and therefore relatively light-weighted, which reduces the total weight of the floor panel. Experiments have shown that it is in particular advantageous in case the density of each crust layer is between 8% and 12% larger, in particular about 10% larger, than the density of the core layer. The density of the core layer is preferably situated between 1000 and 1800 $kg/m^3$, preferably between 1100 and 1500 $kg/m^3$, more preferably between 1200 and 1400 $kg/m^3$. The density of the upper crust layer is preferably between 1100 and 2000 $kg/m^3$, preferably between 1400 and 1800 $kg/m^3$, more preferably between 1500 and 1600 $kg/m^3$. Primarily, the invention relates to floor panels, more particularly decorative floor panels for forming a floor covering, however, it is not excluded to apply the panels according to the invention with other forms of coverings, for example, as wall panels, ceiling panels and the like.

The floor panel according to the invention may be a glue down floor panel. However, it is also imaginable, and often advantageous, in case the floor panel, in particular the core layer, comprises a first pair of opposite edges, said first pair of opposite edges comprising complementary coupling parts allowing to mutually couple of plurality of floor panels to each other. This allows the panels according to the invention to be installed floatingly. More preferably, the coupling parts at said first pair of edges form a first locking system which effects a locking in a plane defined by the floor panel and perpendicular to the respective edges, as well as form a second locking system which effects a locking perpendicular to said plane defined by the floor panels. This dual locking effect, both in horizontal and vertical direction, improves the mutual locking of adjacent floor panels. Preferably the floor panel, in particular the core layer, comprises a second pair of opposite edges, wherein both pairs of opposite edges comprise coupling parts allowing to mutually couple a plurality of floor panels to each other. More preferably, the coupling parts at the first pair of opposite edges are configured such that two of such panels can be coupled to each other at these edges by means of a turning movement, and the coupling parts at the second pair of opposite edges are configured such that two of such floor panels can be coupled to each other by means of a downward movement of one panel in respect to the other, more particularly by means of the downward movement obtained as a result of the turning movement at the first pair of edges. The second locking system at the second pair of edges may consist of locking parts engaging behind each other, which can be brought one behind the other by their elasticity and/or movability. By also integrating the coupling parts at the second pair of sides into the core layer, great properties are commonly obtained for realizing a coupling which allows a locking by means of a downward movement. It should be clear that these panels can be installed floatingly, which, however, does not exclude that, according to an alternative, they can be glued to the underlying surface, as well.

In addition to the presence of the magnesium oxide in the core layer and the upper crust layer, preferably the core layer and/or the upper crust layer(s) comprises magnesium sulphate and/or magnesium chloride. Both magnesium sulphate and magnesium chloride act as binder (binding agent). In the context of the invention, magnesium oxide and a suitable binder (e.g. magnesium sulphate and/or magnesium chloride) preferably have a combined content in the total mineral material of about 60 to 90 wt. %. Further, the weight ratio between magnesium oxide and a suitable binder, is in the range of 4:1 to 2:1, and preferably about 3:1. Since magnesium sulphate absorbs significant less water compared to magnesium chloride, it is commonly preferred to apply magnesium sulphate as (primary) binder, which secures sufficient rigidity of the floor panel, also in relatively humid environments. This preference does, however, not exclude the presence of magnesium chloride in the core layer.

In a preferred embodiment the core layer and/or the upper crust layer(s) comprises wood fibres. The presence of wood fibres commonly improves the processability of these layers, which will facilitate the production of the floor panel as such. Moreover, the presence of wood fibres in the upper crust layer allows a decorative paper layer to be durable glued on top of said upper crust layer. Both wood and paper are cellulose based, allowing a relatively firm and durable attachment to each other. To this end, it is advantageous in case the upper crust layer comprises at least 10 wt. % wood, and more preferably between 40 and 50 wt. % wood. The weight content of wood fibres in the core layer is preferably larger than the weight content of wood fibres in the upper crust layer. This allows the upper crust layer(s) to obtain an increased density compared to the density of the core layer, which is favourable for sanding the upper crust layer. Instead of, or in addition to, also other kind of natural fibres, in particular cellulose fibres, such as bamboo fibres or straw fibres, can be applied in the core layer and/or the upper crust layer(s).

Preferably, both the core layer and the upper crust layer comprise water, wherein the weight content of water in the core layer is more preferably larger than the weight content of water in the upper crust layer. This allows contributes to the increase of the density of the upper crust layer(s) compared to the density of the core layer. Here, it is noted that magnesium oxide will react with water resulting in magnesium hydroxide ($MgO+H_2O \rightarrow Mg(OH)_2$). Moreover, also magnesium sulphate, if applied, may be hydrated by the presence of water, predominantly resulting in magnesium sulphate heptahydrate.

The presence of the at least one upper reinforcement layer leads to significant improvement of the floor panels as such, which is favourable both during production (in particular sanding) and during use of the floor panels. Moreover, the reinforcement layer commonly leads to improvement of the acoustic (sound-dampening) properties of the tiles. The reinforcement layer may comprise a woven or non-woven fibre material, for example a fibreglass material. They may have a thickness of 0.2-0.4 mm. Preferably the upper reinforcing layer comprises a fiberglass mesh. The fiberglass mesh preferably has a mesh size of at least 5×5 mm, and more preferably (about) 7×7 mm. The fiberglass mesh preferably has an area weight of at least 90 $g/m^2$ to provide sufficient strength to the floor panel. The application of a low alkaline fiberglass mesh is preferred in order to ensure a long lasting strength. Since, fibres of fibreglass may lead to itching of the human skin during use/(de)installation of the floor panels, the fiberglass mesh is preferably provided with a coating. This makes the fibres, in particular the fibre ends less sharp for the human skin. The same applies in case separate (loose) fibres of fibreglass are used as reinforcement layer. Suitable coatings are e.g. a wax, a resin, or another type of coating.

In a preferred embodiment the laminate of the floor panel according to the invention further comprises: at least one magnesium oxide based lower crust layer positioned underneath the core layer, wherein the density of said at least one lower crust layer is preferably larger than the density of the core layer; and at least one lower reinforcing layer situated in between said core layer and said at least one lower crust layer. The application of at least one lower crust layer and at least one lower reinforcing layer situated in between the lower crust layer and the core layer, not only allows the floor panel according to the invention additional strength, but also allows the lower crust layer to be sanded, and hence to be reduced in thickness during production. This means that the floor panel can be sanded both at the top surface and at the bottom surface of the floor panel during production (either simultaneously and/or successively), which allows to control the thickness of the upper crust layer, the thickness of the lower crust layer, and consequently to control the panel thickness as such. It is advantageous in case the laminate comprises a plurality of lower reinforcing layers, preferably two lower reinforcing layers, stacked on top of each other. The application of two (or more) lower reinforcing layers commonly significantly improves the panel strength. Here, it is commonly beneficial in case the laminate comprises a plurality of lower crust layers, wherein at least one lower crust layer is positioned in between at least two lower reinforcing layers, and wherein at least one lower crust layer is positioned underneath a lowest, lower reinforcing layer. The thickness of the intermediate lower crust layer enclosed by both lower reinforcement layers is commonly small, typically about 1 mm or less. The density of the lower crust layer is preferably between 1100 and 2000 $kg/m^3$, preferably between 1400 and 1800 $kg/m^3$, more preferably between 1500 and 1600 $kg/m^3$. The composition of the lower crust layer may be identical to the composition of the upper crust layer, expect for the fact that the lower crust layer may be free of wood fibres. This improves the (desired) rigidity of the lower crust layers. The lower reinforcement layer(s) may have an identical composition compared to the upper reinforcement layer(s), and is preferably (also) formed by an, optionally at least partially coated, fiberglass mesh. A backing layer may be applied to the underside of the (lowest) lower crust layer. It is imaginable that, in case the laminate comprises (i) at least one magnesium oxide based lower crust layer positioned underneath the core layer, wherein the density of said at least one lower crust layer is preferably larger than the density of the core layer; and (ii) at least one lower reinforcing layer situated in between said core layer and said at least one lower crust layer, that the upper crust layer(s) may be omitted, and optionally the upper reinforcing layer(s) may also be omitted.

On top of the upper crust layer, a top structure is commonly attached, preferably by means of gluing, wherein said top structure comprises a decorative layer and a wear layer covering said decorative layer. The decorative layer is composed of a film provided and/or printed with a motif. The decorative layer may be a paper layer and/or a polymer layer, such as a PVC layer. The wear layer is commonly substantially transparent. The wear layer may consist of one or more transparent lacquer layers. The wear layer may consist of a thin layer of vinyl (PVC), in which wear-resistant particles, preferably ceramic particles, such as corundum and the like, are incorporated. Instead of applying a polymer decorative layer, the laminate may also comprise a urea-formaldehyde (resin) impregnated, decorative paper layer, attached, preferably glued, to the upper crust layer. The advantage of this latter embodiment is that the urea-formaldehyde also acts a relatively scratch-resistant wear layer. Moreover, the paper layer can be glued relatively firmly and durable to the upper crust layer, in particular in case the upper crust layer is provided with wood fibres as mentioned above. Typically, the thickness of the top structure in the panel of the invention is in the range of 0.2 to 2.0 mm.

The invention also relates to a method of producing a floor panel according to the steps of:
A) providing a laminate of:
a magnesium oxide based core layer;
at least one magnesium oxide based upper crust layer positioned on top of said core layer, wherein the density of said upper crust layer is larger than the density of the core layer; and
at least one upper reinforcing layer situated in between said core layer and said at least one upper crust layer; and
reducing the thickness of at least one upper crust layer by subjecting said upper crust layer to a sanding treatment.

During the sanding treatment according to step B) material is physically removed (etched/blasted away). This removal of material can be realized in a very accurate manner by using existing sandblasting equipment, which results in both an accurate control of the thickness of the upper crust layer, and hence of the panel as such, and also results in a relatively uniform thickness of the upper crust layer and hence an even (flat) upper surface of the panel as such. During step B), preferably use is made of a sander with abrasive belt. For a better result it is recommended to sand first with an aggressive (sand)paper, for example a (sand) paper with a typical grit size of 80. Depending on the crust layer roughness, it may be necessary to repeat this sanding step with the same (sand)paper several times, preferably 2 or 3 times. Subsequently, the crust layer can be sanded with at least one (sand)paper having a more fine grit. Here, it is imaginable, for example, to sand one time with sandpaper having a grit size of 120 followed by sanding the crust layer with sandpaper having a grit size of 240. It is imaginable that the laminate used during step A) additionally comprises:
at least one magnesium oxide based lower crust layer positioned underneath the core layer, wherein the density of said at least one lower crust layer is larger than the density of the core layer; and
at least one lower reinforcing layer situated in between said core layer and said at least one lower crust layer;

and that the method also comprises step C) comprising reducing the thickness of at least one lower crust layer by subjecting said upper crust layer to a sanding treatment. Preferably, the method comprises step D), following step B), wherein step D) comprises attaching a decorative layer, preferably a urea-formaldehyde impregnated, decorative paper layer to the sanded upper crust layer. Advantages and alternative embodiments have already been addressed above in a comprehensive manner.

The invention further relates to a covering, in particular a floor covering, comprising a plurality of interconnected panels according to the above.

BRIEF DESCRIPTION OF THE DRAWINGS

The invention will be elucidated on the basis of non-limitative exemplary embodiments shown in the following figures. Herein.

DESCRIPTION OF THE INVENTION

Figure 6:
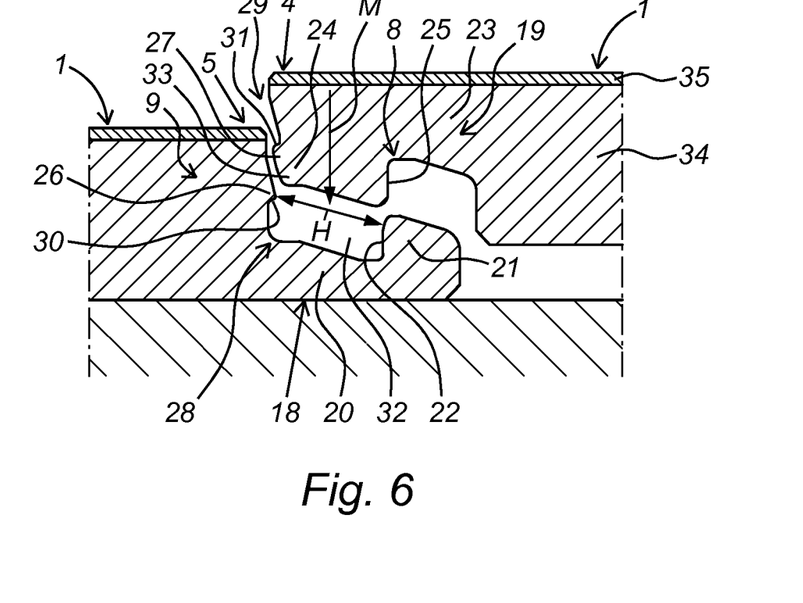
FIGS. 6 and 7 represent how the panels fit into each other at their short sides.
Figure 7:
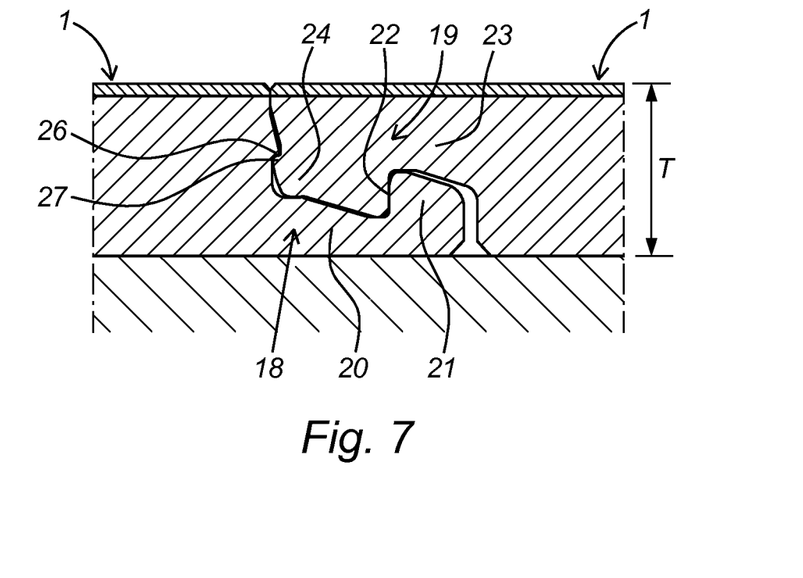

In the represented example shown in FIGS. 1-7, the panel 1 is made as an oblong rectangular strip and thus comprises a first pair of opposite edges 2-3, which in this case form the long sides of the panel 1, and a second pair of opposite edges 4-5, which form the short sides of the panel 1. Typically, the floor panel 1 has a width in the range of 100 to 600 mm and a length in the range of 300 to 2500 mm. As is represented more in detail in FIGS. 2 and 3, both pairs of opposite edges 2-3 and 4-5 comprise coupling parts 6-7, 8-9, respectively, which allow to mutually couple a plurality of such panels 1 to each other. As specifically represented in the FIGS. 4 and 5, coupling parts 6-7 at the first pair of opposite edges 2-3 are configured such that two of such panels can be coupled to each other at these edges 2-3 in a locking manner by means of a turning movement. Herein, the coupling parts 6-7 form a first locking system which effects a locking in the plane of the panels 1 and perpendicularly to said edges 2-3, thus, in this case in the horizontal direction, as well as form a second locking system, which effects a locking perpendicularly to the plane of the panels 1, in this case, thus, in the vertical direction. To this aim, the coupling parts 6-7 are constructed as a tongue 10 and a groove 11, which provide for the vertical locking and comprise locking parts 12-13, which, in the coupled condition, prevent the shifting apart of the tongue and groove. Herein, it is preferred that, as indicated, the groove 11 is limited by a lower lip 14 and an upper lip 15, and that the locking parts 12 and 13 are performed in the form of cooperating projections, at the lower side of the tongue 10 and at the upper side of the lower lip 14, respectively. The cooperation is performed by means of locking surfaces 16 and 17 provided for this purpose. As also represented, it is also preferred that the lower lip 14 extends laterally up to beyond the distal end of the upper lip 15, more particularly such that the locking surface 17 is situated entirely in that portion of the lower lip 14 which is situated beyond the upper lip 15. As schematically represented in FIGS. 6 and 7, the coupling parts 8-9 at the second pair of opposite edges 4-5 are configured such that two of such panels 1 can be coupled to each other by means of a downward movement of one panel in respect to the other. This downward movement will be discussed more detailed below. As is clearly visible in FIG. 7, the coupling parts 8-9 herein also form a first locking system, which effects a locking in the plane of the panels 1 and perpendicular to said edges 4-5, thus, in the case in the horizontal direction, as well as a second locking system, which effects a locking perpendicularly to the plane defined by the panels 1, in this case, thus, the vertical direction. The first locking system is substantially formed of an upwardly directed lower hook-shaped portion 18 situated at the edge 5, as well as of a downwardly directed upper hook-shaped portion 19 which is situated at the opposite edge 4, which hook-shaped portions can be engaged one behind the other by said downward movement. The lower hook-shaped portion 18 consists of a lip 20, which extends laterally from the lower edge of the panel 1 and which is provided with an upwardly directed locking element 21 with a locking surface 22, whereas the upper hook-shaped portion 19 consists of a lip 23, which extends laterally from the upper edge of the panel 1 and which is provided with a downwardly directed locking element 24 with a locking surface 25. The second locking system of the edges at the short sides is formed by locking parts 26-27, which are situated next to the proximal extremity 28 of the lower hook-shaped portion 18 and the distal extremity 29 of the upper hook-shaped portion 19, respectively. The locking parts 26-27 consist of projections engaging one behind the other, which define locking surfaces 30-31. It is noted that the coupling parts 8-9 principally also may be considered a tongue and groove coupling, wherein the locking part 27 functions as a tongue, whereas the groove in which this tongue gets seated, is defined by the locking part 26 functioning as the upper lip, and the first hook-shaped portion 18 functioning as the lower lip. It is noted that the space between the vertically active locking part 26 and the horizontally active locking element 21, which is also indicated by opening H, functions as a female part 32, whereas the locking element 24 is made as a male part 33, which fits into the female part 32. The panel 1 is substantially formed on the basis of magnesium oxide (MgO). More specifically, it comprises a core layer (substrate), which is realized on the basis magnesium oxide, commonly enriched with at least one binder, such as magnesium sulphate and/or magnesium chloride. The core layer is indicated by reference 34 in FIGS. 2-7. In these figures, this substrate is schematically depicted as a single layer. In reality, this may be a single layer as well as several layers, which not all have to comprise magnesium oxide. Usually, a top layer 35 is provided on the core layer 34, which in FIGS. 2-7 also is represented by a single layer, however, in reality also may consist of several layers, typically at least a decorative layer covered by at least one wear layer. The top layer 35 has at least the aim of providing a decorative upper side 36 at the panel 1, preferably in the form of a printed decor and, at least in the case of a floor panel, providing for offering a wear-resistant surface. As indicated in FIG. 7, the panels have a total thickness T. The thickness T preferably has a value situated between 3 and 10 mm. In particular in a practical embodiment, this value will be situated between 4 and 7 mm.

Figure 1:
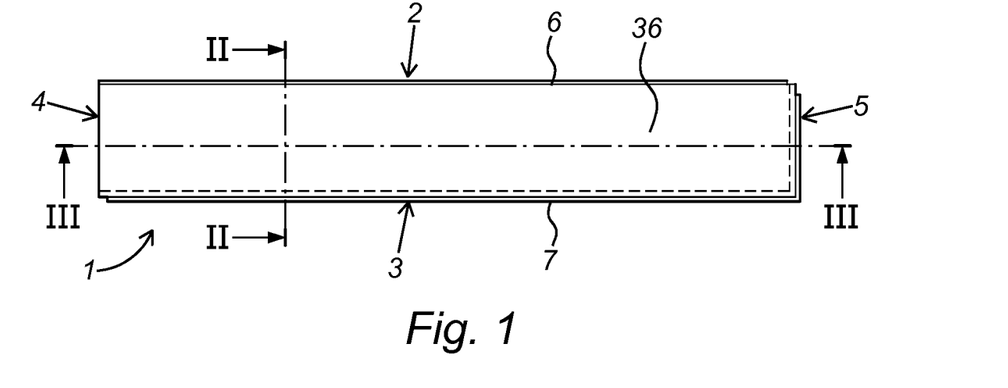
FIG. 1 in top plan view represents a panel, more particularly a floor panel, according to the invention.
Figure 2:
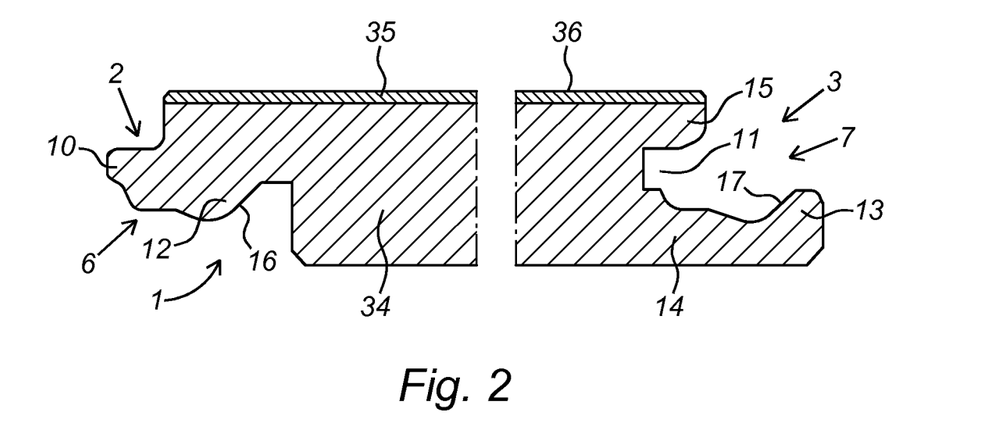
FIGS. 2 and 3, at a larger scale, represent cross-sections according to the lines II-II and in FIG. 1.
Figure 3:
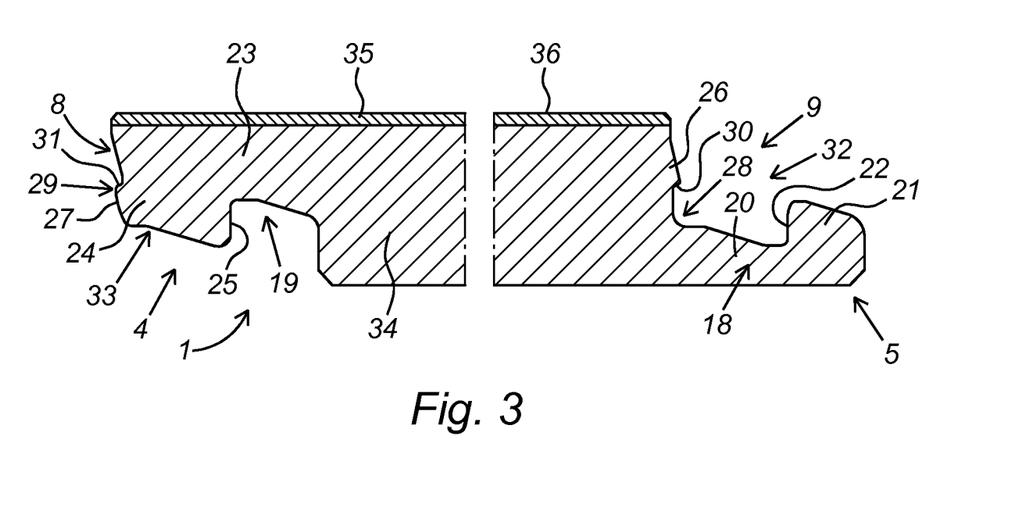
Figure 4:
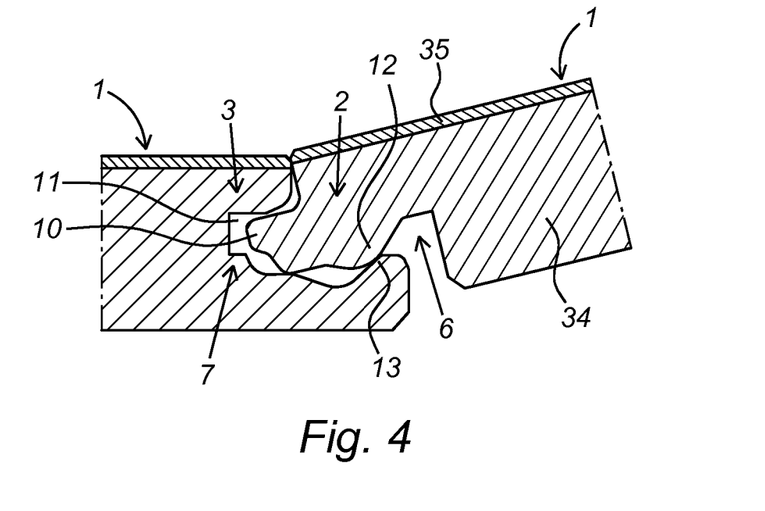
FIGS. 4 and 5 represent how the panels can be interconnected at their long sides.
Figure 5:
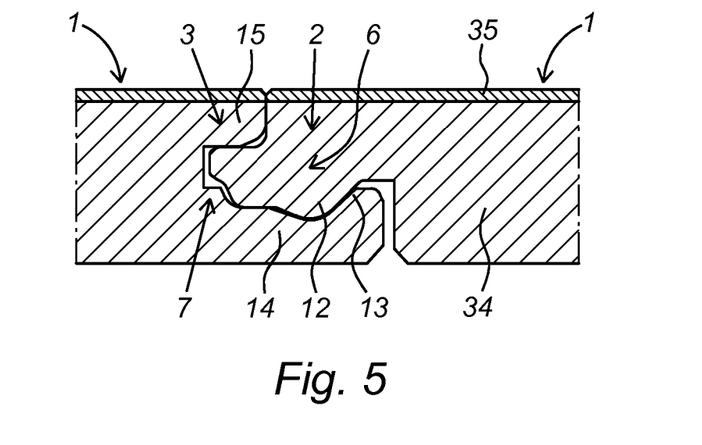
Figure 8:
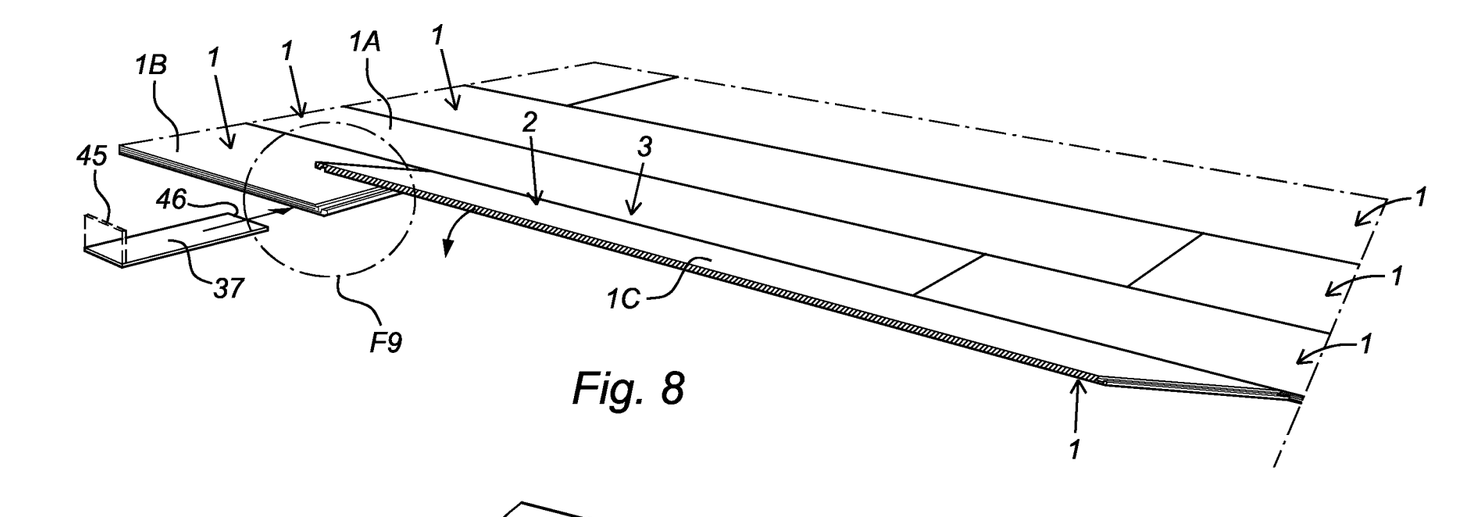
FIG. 8 represents how a plurality of panels from FIG. 1 can be connected to each other.
Figure 9:
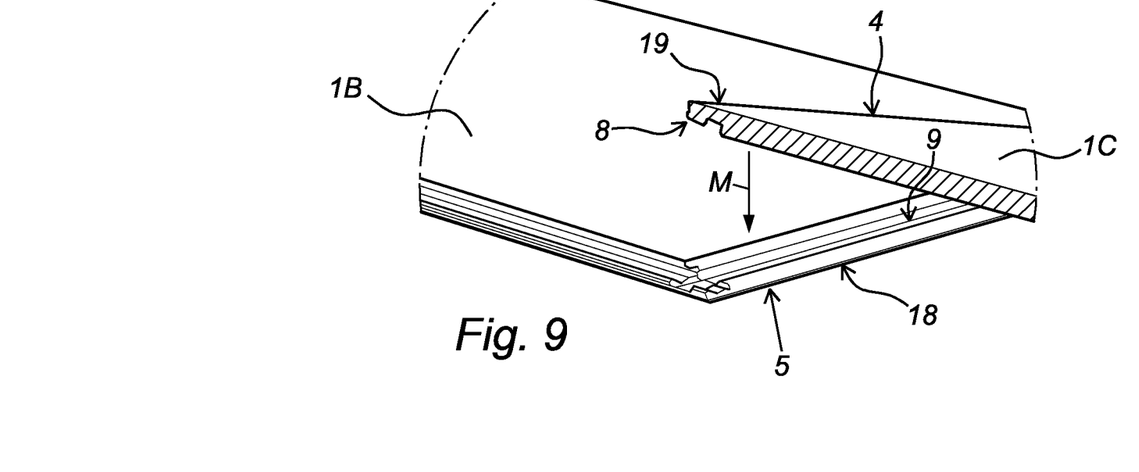
FIG. 9, at a larger scale, represents the portion indicated by F9 in FIG. 8.

In FIGS. 8 and 9, it is schematically represented how the panels 1 can be installed. In order to explain the method, a number of the panels 1, in order to differentiate additionally, are indicated by references 1A, 1B, 1C. The panels 1 are laid down row per row and coupled to each other. In order to obtain that the panels are coupled at the edges 2-3 as well as 4-5, the method comprises at least the following steps: installing a first panel 1A intended for forming part of a first row of panels; coupling a second panel 1B to said first panel 1A, such at first edges 2-3, wherein this second panel 1B is intended for forming part of a second row successive to said first row of panels; coupling in the second row a third panel 1C both to said second panel 1B as to the first panel 1A, wherein the third panel 1C is coupled to the first panel 1A by means of a turning movement, wherein the third panel 1C, from an upwardly pivoted position, is brought into substantially the same plane as the first and second panels, whereas, as a result of this movement and the downward movement created therein, the hook-shaped portions 18-19 engage into each other between the third and second panel. It is clear that normally, between installing the first panel 1A and coupling the second panel 1B thereto, first also all further panels of the row in which the first panel 1A is situated, are installed. Coupling the second panel 1B to the first panel 1A also is performed by connecting the panel 1B at its edge 2, by means of a turning movement as represented in FIG. 4, to the edge 3 of the first panel 1A and possible other panels of the row of the panel 1A. When connecting the panel 1C to the panel 1A, also a turning movement, as in FIG. 4, is applied. Herein, a downward movement M is performed at the short edges 4-5, by which the coupling parts 8 and 9 are engaged into each other. By this downward movement M, in a very broad sense each form of movement is meant in which, in a cross-section as seen in FIGS. 6 and 7, the one panel is let down from a higher position in relation to the other. This movement M does not necessarily have to be a rectilinear movement, and during this movement, temporary deformations in the panels and more particularly in the hook-shaped portions 18 and 19 may occur. Theoretically, a downward movement M, which, seen in cross-section, is rectilinear or almost rectilinear, may be used for engaging a panel 1C into a panel 1B, which means that the right-hand panel in FIG. 6, seen in cross-section, simply is pressed straight down into the position of FIG. 7. It is clear that herein effectively small local deformations will occur, as the locking parts 26 and 27 have to be pressed home one behind each other by means of a snap effect. Herein, the snap effect is obtained by (some) elasticity of the magnesium oxide based material of the core layer 34 and the bending actions in the component parts and compressions in the material occurring as a result thereof.

Figure 10:
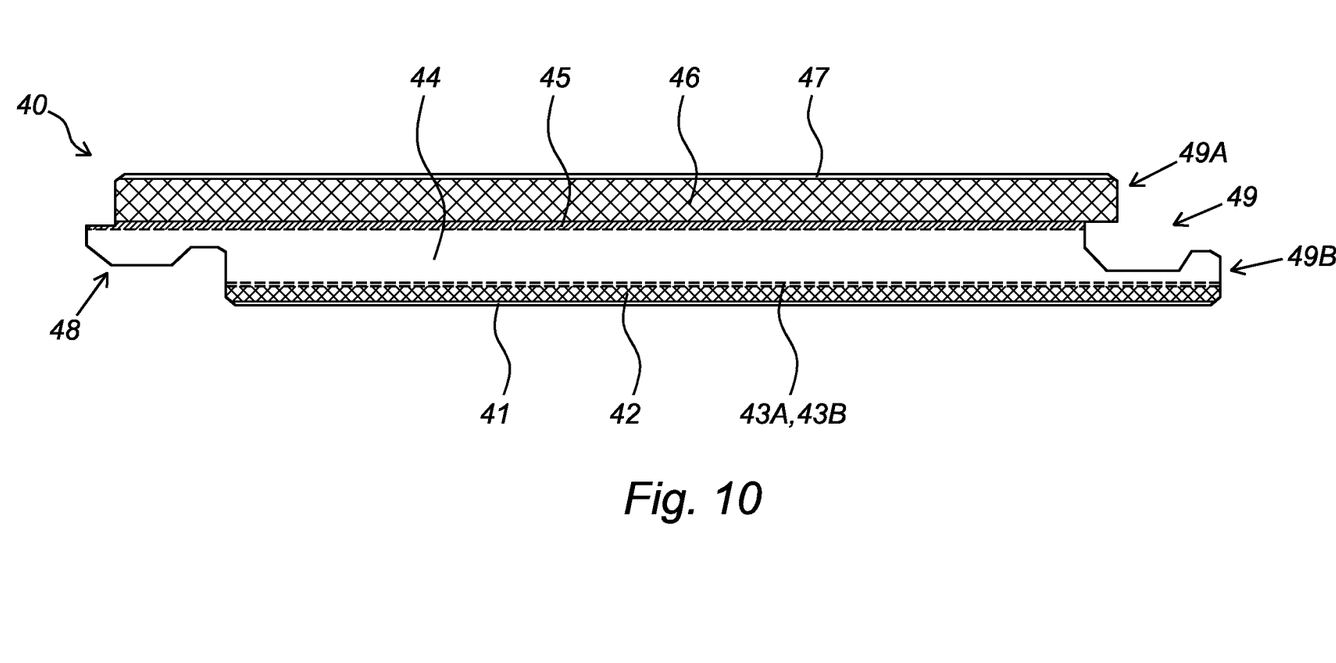
FIG. 10 represents a detailed side view of an alternative floor panel according to the invention.

FIG. 10 shows a detailed side view of an alternative floor panel 40 according to the invention, though which may be the same floor panel 1 as shown in FIGS. 1-9. Floor panel 40 comprises a laminate of layers stacked onto each other, wherein said laminate comprises, from bottom to top, the following layers:

a backing layer 41,
a lower crust layer 42,
two lower fibreglass meshes 43a, 43b,
a core layer 44,
an upper fibreglass mesh 45,
an upper crust layer 46, and a top layer 47 and/or top structure 47.

The backing layer 41 may be composed of paper, in particular resin impregnated paper. Here, melamine resin-impregnated paper is preferably used. A backing layer 41 is helpful in providing an optimum interface between the panel and the underlying surface on which the panels are applied. The crust layers 42, 46 have a higher density compared to the density of the core layer 44, which provide rigidity to the floor panel 40. Moreover, this allows, in combination with the fibreglass meshes 43a, 43b, 45, acting as reinforcement layers, sanding (sandblasting) of the crust layers 42, 46 during production. The crust layers 42, 46 and the core layer 44 comprise magnesium oxide, a binder, such as magnesium chloride and/or magnesium sulphate, and additives. A typical composition of the three layers is given below.

| Layer | Material | Ratio |
|---|---|---|
| Upper crust layer 46 | Magnesium Oxide | 13.4% |
| | Magnesium sulphate heptahydrate | 5.4% |
| | Water | 6.0% |
| | Modifier aluminium sulphate | 0.1% |
| | Fly ash | 4.7% |
| | Wood fibres | 1.1% |
| Core layer 44 | Magnesium Oxide | 13.4% |
| | Magnesium sulphate heptahydrate | 5.4% |
| | Water | 10.7% |
| | Modifier aluminium sulphate | 0.1% |
| | Fly ash | 4.7% |
| | Wood fibres | 4.7% |
| Lower crust layer 42 | Magnesium Oxide | 13.4% |
| | Magnesium sulphate heptahydrate | 5.4% |
| | Water | 6.7% |
| | Modifier aluminium sulphate | 0.1% |
| | Fly ash | 4.7% |

The top layer 47 may consist of one or more layers, and may include a urea-aldehyde resin impregnated decorative paper layer, being attached, preferably by means of one or more glues, to the upper crust layer 46. As shown in FIG. 10 a pair of opposite side edges of the floor panel 40 is provided with complementary coupling parts, in particular a male coupling part 48 and a complementary female coupling part 49, allowing panels to be interconnected, as discussed extensively above. The remaining edges (not shown) of the floor panel 40 may be provided with the same and/or an alternatively shaped set of coupling parts. The male coupling part 48, having the shape of a tongue, is composed of core material, and also includes the upper fibreglass mesh 45. Optionally, a thinned (sanded) part of the upper crust layer 46 may also be included in the male coupling part 40. The female coupling part 49 constitutes a groove configured to accommodate a complementary tongue of an adjacent floor. Said groove is enclosed by an upper lip 49a formed by the upper crust layer 46 and the top layer 47, and a lower lip 49b formed by the core layer 44, both lower fibreglass meshes 43a, 43b and the backing layer 41. The lower part of the groove is formed within the core layer 44, at a distance from the lower fibreglass meshes 43a, 43b. The distance between the lower fibreglass meshes 43a, 43b may be zero, though it is also imaginable that the meshes 43a, 43b are positioned at a distance from each other, wherein material of the lower crust layer 42 is positioned in between both meshes 43a, 43b.

Figure 11A:
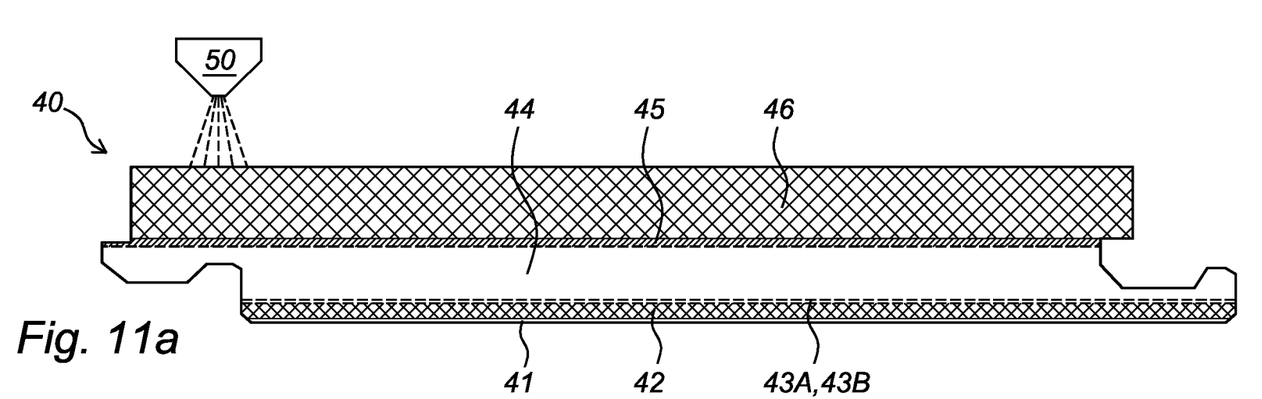
FIGS. 11a-11c represent successive process steps for manufacturing the panel shown in FIG. 10.
Figure 11B:
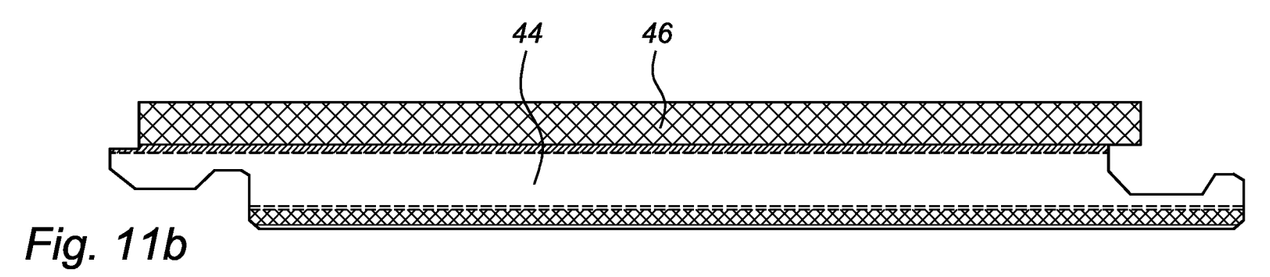
Figure 11C:
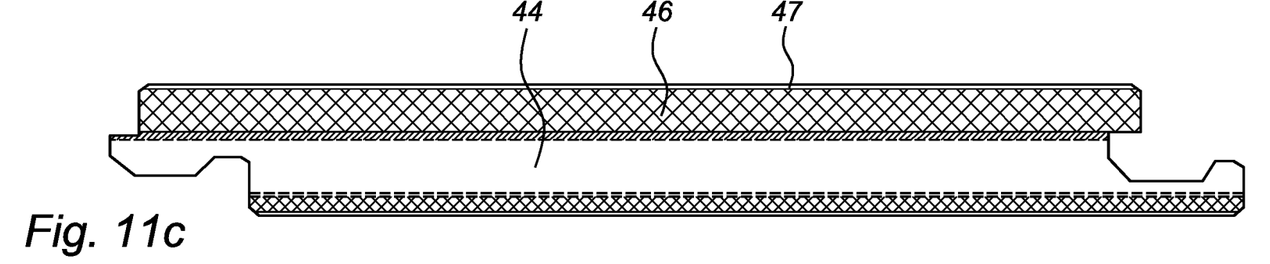

In FIGS. 11a-11c successive method steps for manufacturing the floor panel 40 as shown in FIG. 10 are shown. In FIG. 11a a starting laminate with a originally, relatively thick upper crust layer 46 is shown. Typically this upper crust layer 46 is applied as slurry (paste) on top of the upper mesh 45 positioned on top of the core layer 44. By means of known high-precision sandblasting equipment 50, the thickness of the upper crust layer 46 is reduced by removing material from said upper crust layer 46 until a desired panel thickness is achieved (FIG. 11b). Subsequently, shown in FIG. 11c the top layer 47 is applied, preferably by gluing on top of the upper crust layer 46, resulting in the final floor panel 40 as shown in FIG. 10. Optionally, also the lower crust layer 42 could be subjected to a sanding treatment (prior to applying the backing layer 41), which provides more flexibility and freedom in adjusting the panel thickness based upon a (uniform, and typically oversized) starting laminate.

Figure 12:
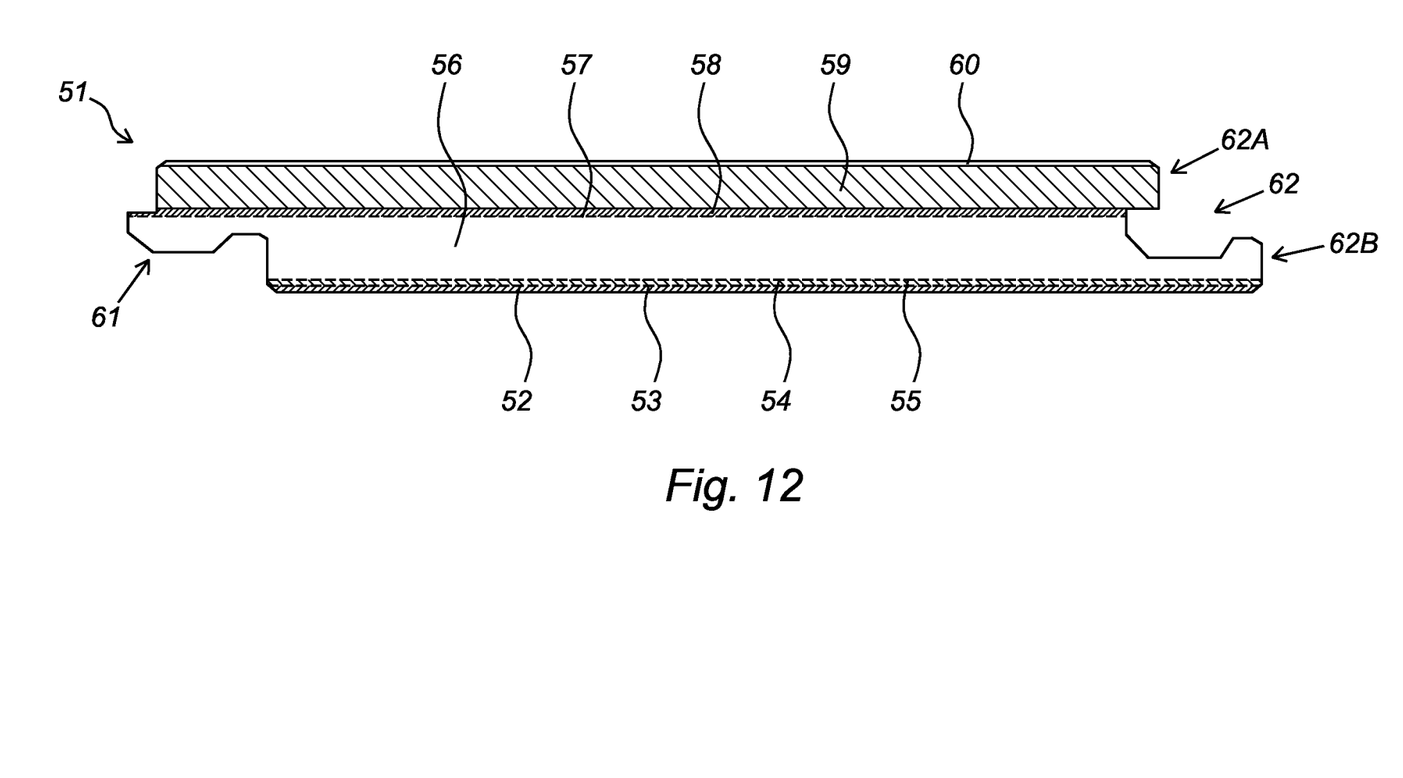
FIG. 12 represents a detailed side view of yet another floor panel according to the invention.

FIG. 12 shows a detailed side view of yet another floor panel 51 according to the invention, though which (also) may be the same floor panel 1 as shown in FIGS. 1-9. Floor panel 51 comprises a laminate of layers stacked onto each other, wherein said laminate comprises, from bottom to top, the following layers:
a first lower crust layer 52,
a first lower fibreglass mesh 53
a second lower crust layer 54,
a second lower fibreglass mesh 55,
a core layer 56,
an upper fibreglass mesh 57,
an upper crust layer 58,
a PVC sublayer 59, and
a PVC top layer 60 or top structure 60.

In this embodiment, the PVC top layer 60 consists of a PVC décor layer covered by a PVC wear layer. The PVC sublayer 59 is preferably free of any plasticizer. The sublayer 59 is positioned between the core layer 56 and the top layer 60 in order to reach a desired effect such as sound improvement, indentation resistance improvement. The composition of the other layers 52-58 may be identical to the equivalent layers shown in FIG. 10. The distance between both lower meshes 53, 55 is about 1 mm. As shown in FIG. 12 a pair of opposite side edges of the floor panel 51 is provided with complementary coupling parts, in particular a male coupling part 61 and a complementary female coupling part 62, allowing panels to be interconnected, as discussed extensively above. The remaining edges (not shown) of the floor panel 51 may be provided with the same and/or an alternatively shaped set of coupling parts. The male coupling part 61, having the shape of a tongue, is composed of the core layer 56, the upper fibreglass mesh 57, and the upper crust layer 58. The female coupling part 62 constitutes a groove configured to accommodate a complementary tongue of an adjacent floor. Said groove is enclosed by an upper lip 62a formed by the upper crust layer PVC sublayer 59 and the top layer 60, and a lower lip 62b formed by the core layer 56, both lower fibreglass meshes 53, 55, and the first and second lower crust layers 52, 54. The lower part of the groove is formed within the core layer 44, at a distance from the lower fibreglass meshes 43a, 43b to secure sufficient rigidity and strength of the female coupling part 62. The floor panel 51 shown in FIG. 12 is waterproof, fire-resistant, and rigid.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The verb "comprise" and conjugations thereof used in this patent publication are understood to mean not only "comprise", but are also understood to mean the phrases "contain", "substantially consist of", "formed by" and conjugations thereof.

The invention claimed is:

1. A floor panel or wall panel, comprising a laminate of:
   a magnesium oxide based core layer comprising magnesium oxide and magnesium sulphate and/or magnesium chloride, wherein magnesium oxide and magnesium sulphate and/or magnesium chloride comprise 60-90% of the total mineral content of the core layer, wherein the core layer further comprises wood fibres;
   at least one magnesium oxide based upper crust layer positioned on top of said core layer, said upper crust layer comprising wood fibres;
   at least one magnesium oxide based lower crust layer positioned underneath the core layer;
   at least one upper reinforcing layer situated in between said core layer and said at least one upper crust layer;
   at least one backing layer situated on an underside of the lower crust layer; and
   at least one decorative layer and at least one wear layer attached to a top surface of the upper crust layer;
       wherein the density of said upper crust layer is at least 8% larger than the density of the core layer; and
       wherein the weight content of wood fibres in the core layer is larger than the weight content of wood fibres in the upper crust layer.

2. The panel according to claim 1, further comprising a first pair of opposite edges, said first pair of opposite edges comprising complementary coupling parts allowing to mutually couple of plurality of floor panels to each other.

3. The panel according to claim 2, further comprising a second pair of opposite edges, wherein both pairs of opposite edges comprise coupling parts allowing to mutually couple a plurality of floor panels to each other.

4. The panel according to claim 1, wherein the upper crust layer comprises magnesium sulphate and/or magnesium chloride.

5. The panel according to claim 1, wherein both the core layer and the upper crust layer comprise water, and wherein the weight content of water in the core layer is larger than the weight content of water in the upper crust layer.

6. The panel according to claim 1, wherein the upper reinforcing layer comprises a fiberglass mesh.

7. The panel according to claim 6, wherein the fiberglass mesh has a mesh size of at least 5×5 mm.

8. The panel according to claim 6, wherein the fiberglass mesh has an area weight of at least 90 g/m$^2$.

9. The panel according to claim 6, wherein the fiberglass mesh is provided with a coating.

10. The panel according to claim 1, wherein the density of the core layer is between 1000 and 1800 kg/m$^3$.

11. The panel according to claim 1, wherein the density of the upper crust layer is between 1100 and 2000 kg/m$^3$.

12. The panel according to claim 1, wherein the density of said at least one lower crust layer is larger than the density of the core layer; and, the floor panel further comprises
    at least one lower reinforcing layer situated in between said core layer and said at least one lower crust layer.

13. The panel according to claim 12, wherein the laminate comprises a plurality of lower reinforcing layers stacked on top of each other.

14. The panel according to claim 13, wherein the laminate comprises a plurality of lower crust layers, wherein at least one lower crust layer is positioned in between at least two lower reinforcing layers, and wherein at least one lower crust layer is positioned underneath a lowest, lower reinforcing layer.

15. The panel according to claim 12, wherein the density of the lower crust layer is between 1100 and 2000 kg/m$^3$.

16. The panel according to claim 12, wherein the lower crust layer comprises magnesium sulphate and/or magnesium chloride.

17. The panel according to claim 12, wherein the lower crust layer is free of wood fibres.

18. The panel according to claim 12, wherein both the core layer and the lower crust layer comprise water, and wherein the weight content of water in the core layer is larger than the weight content of water in the lower crust layer.

19. The panel according to claim 12, wherein the lower reinforcing layer comprises a fiberglass mesh.

20. The panel according to claim 19, wherein the fiberglass mesh has a mesh size of at least 5×5 mm.

21. The panel according to claim 19, wherein the fiberglass mesh has an area weight of at least 90 g/m$^2$.

22. The panel according to claim 19, wherein the fiberglass mesh is provided with a coating.

23. The panel according to claim 1, wherein the laminate comprises a top structure attached to the upper crust layer comprising the decorative layer and the wear layer covering said decorative layer.

24. The panel according to claim 1, wherein the laminate comprises a urea-formaldehyde impregnated, decorative paper layer, attached to the upper crust layer.

* * * * *